(12) United States Patent
D'Amico et al.

(10) Patent No.: US 7,363,529 B1
(45) Date of Patent: Apr. 22, 2008

(54) AUTOMATED DSL NETWORK TESTING SOFTWARE TOOL

(75) Inventors: Terin L. D'Amico, Baltimore, MD (US); Yong Huang, Nashua, NH (US); YiHsiang Chin, Wayland, MA (US); Thomas Patrick O'Brien, Jr., Eldersburg, MD (US)

(73) Assignees: Verizon Services Corp., Arlington, VA (US); Verizon Data Services LLC, Irving, TX (US)

( * ) Notice: Subject to any disclaimer, the term of this patent is extended or adjusted under 35 U.S.C. 154(b) by 302 days.

(21) Appl. No.: 11/074,123

(22) Filed: Mar. 7, 2005

Related U.S. Application Data

(63) Continuation of application No. 10/123,803, filed on Apr. 16, 2002, now Pat. No. 6,889,339.

(60) Provisional application No. 60/353,074, filed on Jan. 30, 2002.

(51) Int. Cl.
*G06F 11/00* (2006.01)

(52) U.S. Cl. .................... 714/4; 709/223; 709/224; 379/15.01

(58) Field of Classification Search .................... 714/4; 709/223, 224; 379/15.01
See application file for complete search history.

(56) References Cited

U.S. PATENT DOCUMENTS

| 5,359,646 | A | * | 10/1994 | Johnson et al. | .......... 379/27.02 |
| 5,987,633 | A | * | 11/1999 | Newman et al. | ............ 714/712 |
| 6,002,746 | A | * | 12/1999 | Mulcahy et al. | ............... 379/22 |
| 6,189,031 | B1 | * | 2/2001 | Badger et al. | .............. 709/224 |
| 6,493,425 | B1 | * | 12/2002 | Abe | .......................... 379/1.01 |
| 6,889,339 | B1 | * | 5/2005 | D'Amico et al. | ............... 714/4 |
| 6,901,530 | B2 | * | 5/2005 | Cerami et al. | .................. 714/4 |
| 7,103,795 | B1 | * | 9/2006 | Hansen | .......................... 714/4 |

* cited by examiner

*Primary Examiner*—Emerson Puente

(57) ABSTRACT

A DSL network testing tool [110] tests multiple elements 9141, 143] in a DSL circuit. The testing tool may operate in either a single circuit test mode or a batch mode. In batch test mode, the network testing tool receives multiple DSL phone numbers and automatically tests the DSL circuit's elements corresponding to the phone numbers. The test information may be used when troubleshooting of provisioning DSL circuits.

19 Claims, 7 Drawing Sheets

US 7,363,529 B1

AUTOMATED DSL NETWORK TESTING SOFTWARE TOOL

This is a continuation of prior U.S. patent application Ser. No. 10/123,803, filed Apr. 16, 2002 now U.S. Pat. No. 6,899,339, titled "AUTOMATED DSL NETWORK TESTING SOFTWARE TOOL," which claims the benefit of priority under 35 U.S.C. §119(e) of provisional application serial number 60/353,074, filed Jan. 30, 2002, the entire contents of which are incorporated herein by reference.

BACKGROUND OF THE INVENTION

A. Field of the Invention

The present invention relates generally to network management, and more specifically, to a software tool for automating the testing and reporting of status information relating to DSL networks.

B. Description of Related Art

DSL (digital subscriber line) is a technology for bringing high-bandwidth information to homes and small businesses over ordinary copper telephone lines. A DSL line can simultaneously carry both data and voice signals. The data portion of the line may be continuously available to the user, making DSL an "always-on" connection. Special digital hardware attached to both ends of the line allows data transmission over the wires at far greater speed than standard analog 56 K modems.

DSL is offered to users by DSL providers. DSL providers connect user DSL modems, through a digital subscriber line, to a central office. Typically, the distance between the user and the central office must be less than a certain distance, such as about four miles, for the DSL connection to operate properly. At the central office, signals from the DSL user may be packetized and transmitted to a larger network, such as an asynchronous transfer mode (ATM) network that connects to an Internet Service Provider (ISP).

DSL providers, when provisioning and/or maintaining a DSL line, often run a number of tests on various portions of a particular DSL circuit, where the DSL circuit includes equipment in the central office and equipment connecting the central office to the ISP. The tests are typically run using testing tools that are provided natively to the network elements being tested. For example, a user may test the operation of a particular gateway router by opening a telnet connection with the gateway router and then activating diagnostic tools provided within the router.

Conventionally, each of multiple DSL circuit tests are run independently by a technician who initiates individual communication sessions with each piece of equipment being tested. This can result in a cumbersome and time-consuming test process.

Thus, there is a need in the art to improve the testing and provisioning of DSL circuits.

SUMMARY OF THE INVENTION

Systems and methods consistent with the principles of this invention address this and other needs by providing a network testing tool that automatically tests DSL circuits.

One aspect of the invention is directed to a system comprising a plurality of DSL circuit elements. The DSL circuit elements provide DSL service to customers. The system also includes a database and a network testing tool coupled to the database. The network testing tool is configured to receive inventory information from the database that associates selected ones of the DSL circuit elements with a DSL number and to automatically communicate with and test the selected ones of the DSL circuit elements.

A second aspect consistent with the invention is directed to a method of testing DSL circuits. The method includes receiving a number identifying a DSL circuit and querying a database based on the number identifying the DSL circuit to receive inventory information describing the DSL circuit. The method further includes automatically initiating tests on network elements identified by the inventory information and writing results of the tests to a database.

Another method consistent with aspects of the invention provides for testing a plurality of DSL circuits in a batch testing mode. The method includes receiving a plurality of DSL numbers identifying multiple DSL circuits and querying a database based on the numbers identifying the DSL circuits to receive inventory information describing the DSL circuits. Further, the method includes grouping the plurality of numbers based on the inventory information such that DSL circuits having similar inventory information are placed in the same group and automatically initiating tests with DSL circuit elements corresponding to each of the groups.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

A DSL network testing tool is described herein that automatically tests multiple elements in a DSL circuit. The test information may be used when troubleshooting or provisioning DSL circuits. The DSL network testing tool provides an integrated application that can be accessed through a web interface. Based on an input telephone number, the tool retrieves associated circuit inventory information, performs a test of the DSL circuit, and provides the test results to a technician or to a database for report generation.

System Overview

Figure 1:
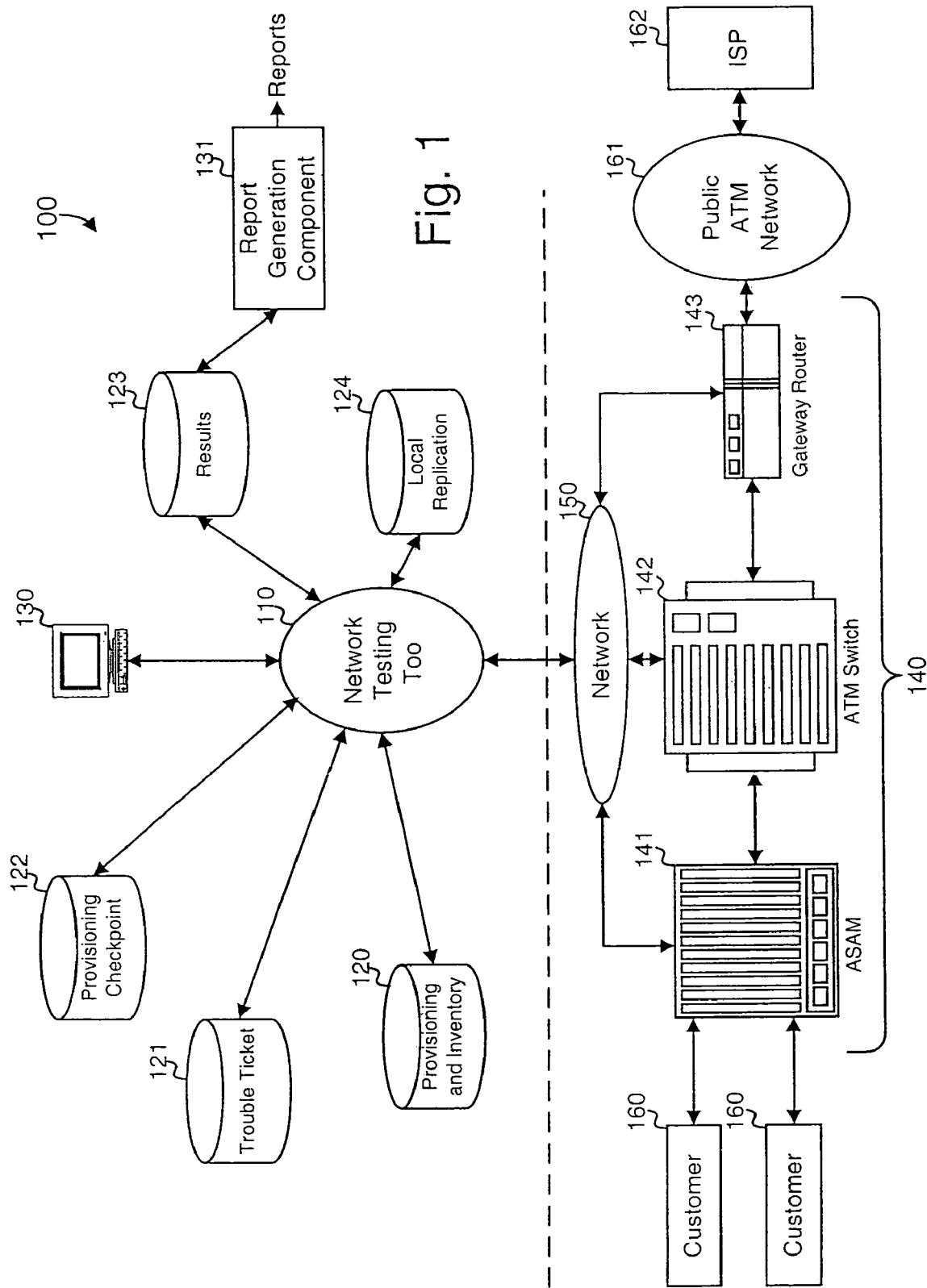
FIG. 1 is a diagram of an exemplary system in which concepts consistent with the present invention may be implemented.

FIG. 1 is a diagram of an exemplary system 100 in which concepts consistent with the invention may be implemented. System 100 includes network testing tool 110. Network testing tool 110 may be a software program designed to test network elements in DSL circuits.

Network testing tool 110 may be connected to a number of databases. As shown, network testing tool 110 interfaces with a provisioning and inventory database 120, a trouble ticket database 121, a provisioning checkpoint database 122, and a results database 123. Provisioning and inventory database 120 stores information relating to customer account information, particularly including the DSL circuit elements used to service each customer. Trouble ticket database 121 stores information relating to DSL circuits that are experiencing service difficulties. For example, a customer whose DSL service is down may call a customer service representative who may then initiate an entry in trouble ticket database 121 that describes the problem. As progress is made on restoring the user's DSL service, the trouble ticket entry stored in database 121 is updated. Provisioning checkpoint database 122 functions as a status database for new DSL installations. This database may include a list of specifications or requirements that are to be completed before a DSL line is successfully provisioned. After the various stages of the provisioning process are completed, elements of the list in provisioning checkpoint database 122 are "checked" as being completed.

Network testing tool 110 may be remotely accessed and controlled in a single circuit testing mode via user interface computer 130. In one implementation, network testing tool 110 may present a web-based interface to the user of computer 130. Accordingly, remote users may interact with network testing tool 110 through any computer that contains a web browsing program and a network connection to network testing tool 110.

Results database 123 is used by network testing tool 110 to store its DSL circuit test results. The stored results may then be accessed and viewed in a number of formats by system users. A report generation component 131 may periodically access results database 123 and generate reports summarizing the results of the DSL circuit tests. In this manner, network administrators can periodically view status information for tested DSL circuits.

Local replication database 124 is a database that network testing tool 110 uses a temporarily store information received from databases 120-122. In contrast to databases 120-122, which may be shared throughout the enterprise and coupled to network testing tool 110 through a network such as a local area network (LAN), database 124 is local to, and dedicated exclusively to, network testing tool 110. Accordingly, relative to databases 120-122, database 124 is a "fast" access database. Data replication at local replication database 124 advantageously allows for local storage of data in case a "production" database (e.g., one of databases 120-122) is down and, by virtue of it being a fast access database, can provide a performance boost.

As shown in FIG. 1, network testing tool 110 is connected to a series of DSL circuit elements 140 through a network 150. Network 150 may be a private network operated by the DSL service provider.

DSL circuit elements 140 include an advanced services access manager (ASAM) 141, an ATM switch 142, and a gateway router 143. ASAM 141 may be a broadband access platform that communicates with DSL data modems of customers 160. ASAMs are typically located in the DSL provider's local office. In addition to controlling the data lines to customers 160, ASAM 141 may simultaneously provide voice lines to customers 160.

Communications with customers 160, after being processed by ASAM 141, are transmitted as ATM (asynchronous transfer mode) cells through ATM switches 142. Gateway router 143 routes the received ATM cells through public ATM network 161 to Internet Service Provider (ISP) 162. ISP 162 may then connect customers 160 to the Internet.

The particular configuration of the DSL circuit elements 140 (i.e., ASAM 141, ATM switch 142, and gateway router 143) shown in FIG. 1 represent an exemplary implementation of possible DSL circuit elements for a particular customer. One of ordinary skill in the art will recognize that other configurations of DSL circuit elements are possible.

Figure 2:
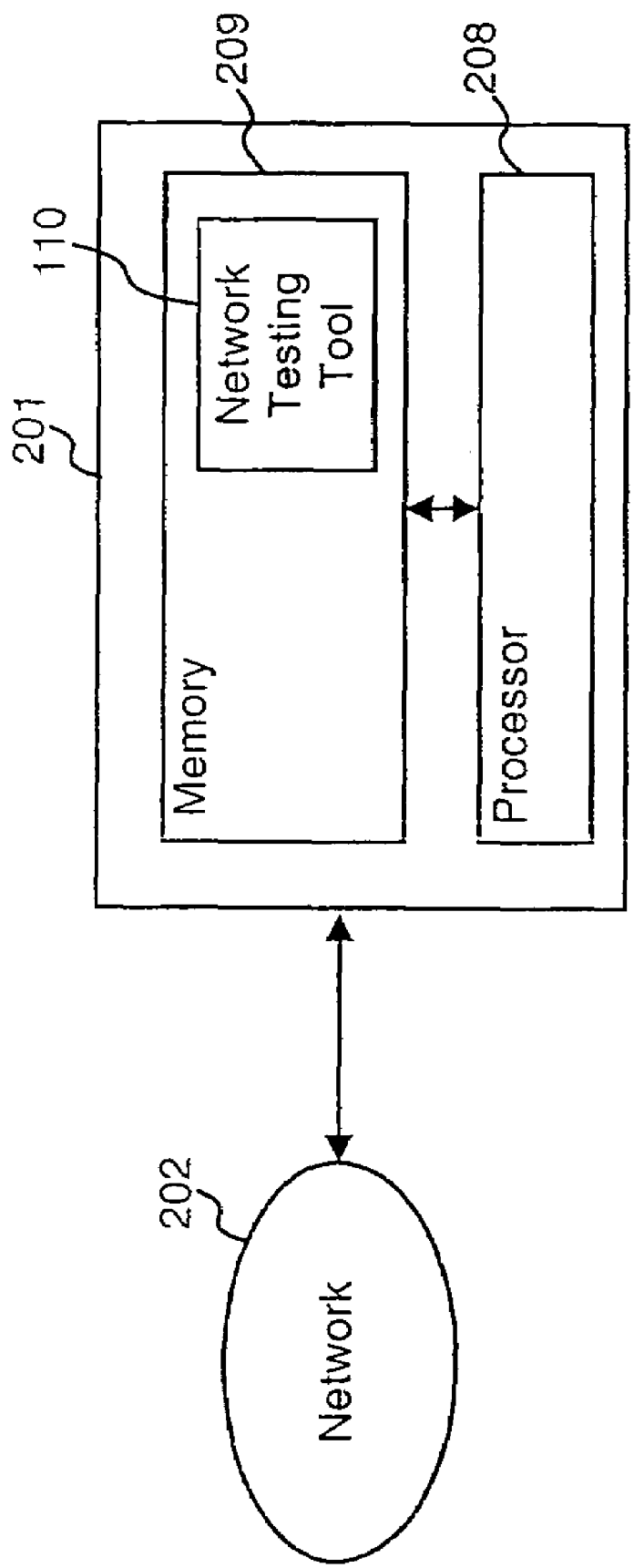
FIG. 2 is a diagram illustrating a computing system in which the network testing tool consistent with the invention may be implemented.

FIG. 2 is a diagram illustrating an implementation of network testing tool 110 in additional detail. As previously mentioned, network testing tool may be implemented as a computer program executed by a computing device, such as computing device 201. Computing device 201 includes a computer-readable medium 209, such as random access memory, coupled to a processor 208. Processor 208 executes program instructions stored in memory 209. Processor 208 may also receive data or program instructions from an external source, such as from databases 120-124 connected either directly to computing device 201 or through network 202. Computing device 201 may also include a number of additional external or internal devices, such as, without limitation, a mouse, a CD-ROM, a keyboard, and a display.

Processor 208 can be any of a number of well-known computer processors, such as processors or microprocessors from Intel Corporation, of Santa Clara, Calif. In general, computing device 201 may be any type of computing platform connected to a network and that interacts with application programs, such as a digital assistant or a "smart" cellular telephone or pager. Computing device 201 is exemplary only; concepts consistent with the present invention can be implemented on any computing device, whether or not connected to a network.

Memory 209 contains an application program, such as network testing tool 110. Accordingly, processor 208 executes the sequences of instructions associated with network testing tool 110. In alternate embodiments, hardwired circuitry may be used in place of or in combination with software instructions to implement aspects of the present invention. Thus, the present invention is not limited to any specific combination of hardware circuitry and software.

Operation of Network Testing Tool

In general, network testing tool 110 tests DSL circuits corresponding to customer DSL phone numbers. Network testing tool 110 has two main modes of operation: single circuit test mode and batch test mode. In batch test mode, network testing tool 110 may automatically query databases 120-122 to obtain lists of DSL phone numbers that are to be tested.

Figure 3:
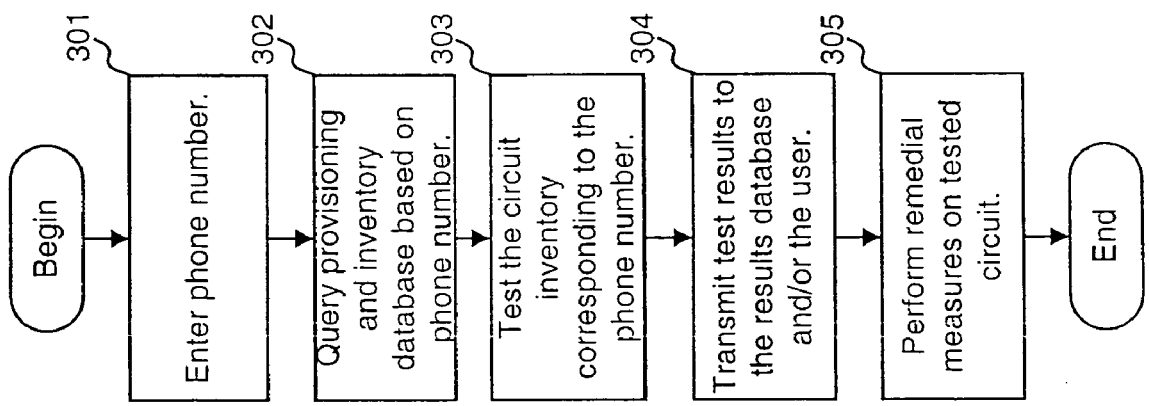
FIG. 3 is a flow chart illustrating high-level operation of the network testing tool when functioning in a single circuit mode.

FIG. 3 is a flow chart illustrating exemplary operation of network testing tool 110 in testing DSL circuit elements 140 for a DSL connection in single circuit test mode. To being, a user, such as a network technician, enters a ten digit phone number (act 301). The phone number identifies the DSL circuit that is to be tested. In one implementation, the phone number may be input by the user through a web browser program, such as a web browser running on user interface computer 130. In response, network testing tool 110 queries provisioning and inventory database 120 for the equipment that is assigned to service the specified ten digit number (act 302). Network testing tool 110 then tests the list of equipment identified from the query to database 120 (act 303). The test results are written to results database 123 (act 304). Alternatively, network testing tool 110 may immediately alert the technician of the test results via the web browser residing at user interface computer 130 in addition to writing the test results to results database 123 (act 304).

In one implementation, in sending the test results to user interface computer 130, network testing tool 110 uses a Java servlet to format and transmit the results to the user interface computer 130. The servlet formats the result data into a HTML (hyper-text markup language) file, which it transmits to the browser of user interface computer 130 for display. By default, Java servlets buffer streams of HTML until the stream is complete. In this situation, however, in order to expedite the test results to the technician in real-time, the servlet is configured to not buffer the result data stream.

By performing tests of the DSL elements for a particular DSL circuit, network testing tool 110 helps technicians diagnose problems with the DSL circuit. In addition to merely diagnosing problems, however, network testing tool 110 may assist the user in taking remedial measures on the tested circuits (act 305). In particular, network testing tool 110 may include remediation templates that are pre-populated with real-time inventory information extracted from provisioning and inventory database 120. The inventory information and the diagnostic information obtained by a technician may be used by the technician in making more informed decisions in scheduling or coordinating field maintenance activity relating to the circuit network elements.

Figure 4:
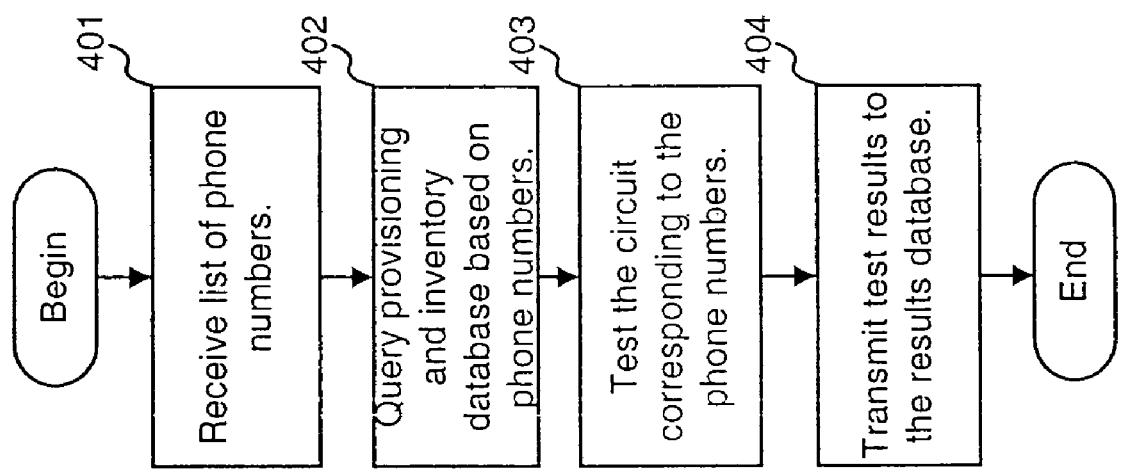
FIG. 4 is a flow chart illustrating high-level operation of the network testing tool when functioning in batch mode.

The operation of network testing tool 110, as described above with reference to FIG. 3, refers to a single circuit test mode. In alternate implementations, network testing tool 110 may operate in a batch testing mode. FIG. 4 is a flow chart illustrating exemplary operation of network testing tool 110 when operating in batch testing mode.

In batch mode, network testing tool 110 begins by receiving a list of ten digit telephone numbers from databases 121 or 122 (act 401). For example, network testing tool 110 may query trouble ticket database 121 at predetermined intervals (e.g., three time a day) to receive a list of outstanding trouble tickets from trouble ticket database 121. For each DSL number, network testing tool 110 queries provisioning and inventory database 120 for the equipment that is assigned to service the specified ten digit number (act 402). Network testing tool 110 then tests the lists of equipment identified from the query to database 120 (act 403). The test results are written to results database 123 (act 404).

The results written to database 123 may be written in the form of a standard results data structure that can be used to run standard reports that identify working versus non-working circuits. Preferably, the results data structure is arranged such that related data is closely grouped, thus making it easier for technicians analyzing the results data structure to identify related problems across multiple DSL circuits. Additionally, network testing tool 110 may automatically scan for patterns in a number of DSL circuits that may indicate a root problem that is common to a number of DSL circuits.

In addition to testing lists of DSL numbers from trouble ticket database 121, network testing tool 110 may periodically receive lists of DSL numbers from provisioning checkpoint database 122. Network testing tool 110 may then test these numbers to verify the progress of a particular DSL circuit in the provisioning process.

In testing DSL circuit elements 140, network testing tool 110 interfaces with each individual circuit element on an individual basis. For example, when testing ASAM 141, network testing tool 110 sends test queries to ASAM 141 that are tailored to the diagnostic abilities of ASAM 141. For example, network testing tool 110 may establish a telnet connection with ASAM 141. Through the telnet connection, network testing tool 110 may transmit diagnostic commands supported by ASAM 141. Network testing tool 110 may interface with and test gateway router 123 in a similar manner. Each diagnostic ability of ASAM 141 and gateway router 123 may be incorporated into network testing tool 110 through a script file customized for the particular circuit element.

Consistent with an aspect of the invention, when testing DSL circuit elements 140, network testing tool 110 may select the order in which the various diagnostic testing capabilities of the DSL circuit elements are accessed in order to optimize testing efficiency. Specifically, testing tool 110 may sort the circuit elements that are scheduled to be tested such that resource conflicts between diagnostic functions are minimized. In other words, when scheduling the various diagnostic tests based on multiple DSL numbers, network testing tool 110 schedules the tests to maximize the use of the diagnostic resources of the network elements. Additionally, based on the result of a test, network testing tool 110 determines whether additional tests are necessary. In some situations, the result of a first test may indicate that additional tests are not necessary. In this situation, network testing tool 110 would not conduct the non-necessary tests. Network testing tool 110 performs the determination of whether additional tests are necessary based on, for example, a prestored hierarchical decision tree that indicates, for any particular testing state, whether additional tests are necessary.

Figure 5:
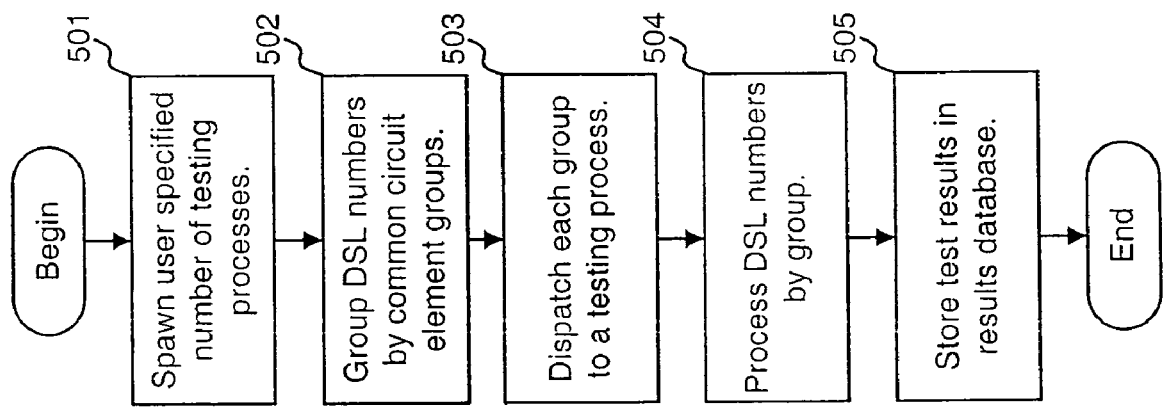
FIG. 5 is a flow chart illustrating methods consistent with the invention by which the network testing tool optimizes the use of system resources.

FIG. 5 is a flow chart illustrating exemplary methods consistent with the invention through which network testing tool 110 optimizes the use of circuit element diagnostic resources, as described previously. When operating in batch mode, network testing tool 110 spawns a specified number of independent testing processes to perform the actual testing (act 501). Network testing tool 110 also groups the input DSL numbers by their associated DSLAM (digital subscriber line access multiplexer) EMS (element management system) DSLAM, and gateway router (act 502). In other words, DSL numbers corresponding to the same DSLAM, EMS DSLAM, or gateway router are associated with a group. Each group is dispatched to a single testing process (act 503). The testing processes process the DSL numbers in their group (act 504). By testing DSL numbers by related groups of numbers, the testing processes have fewer circuits with which they need to establish communications. Additionally, multiple related numbers may require the same test of the same circuit element. Thus, by grouping the DSL numbers, a testing process may perform the test only once. The results of a testing process may be stored in results database 123 (act 505).

Figure 6A:
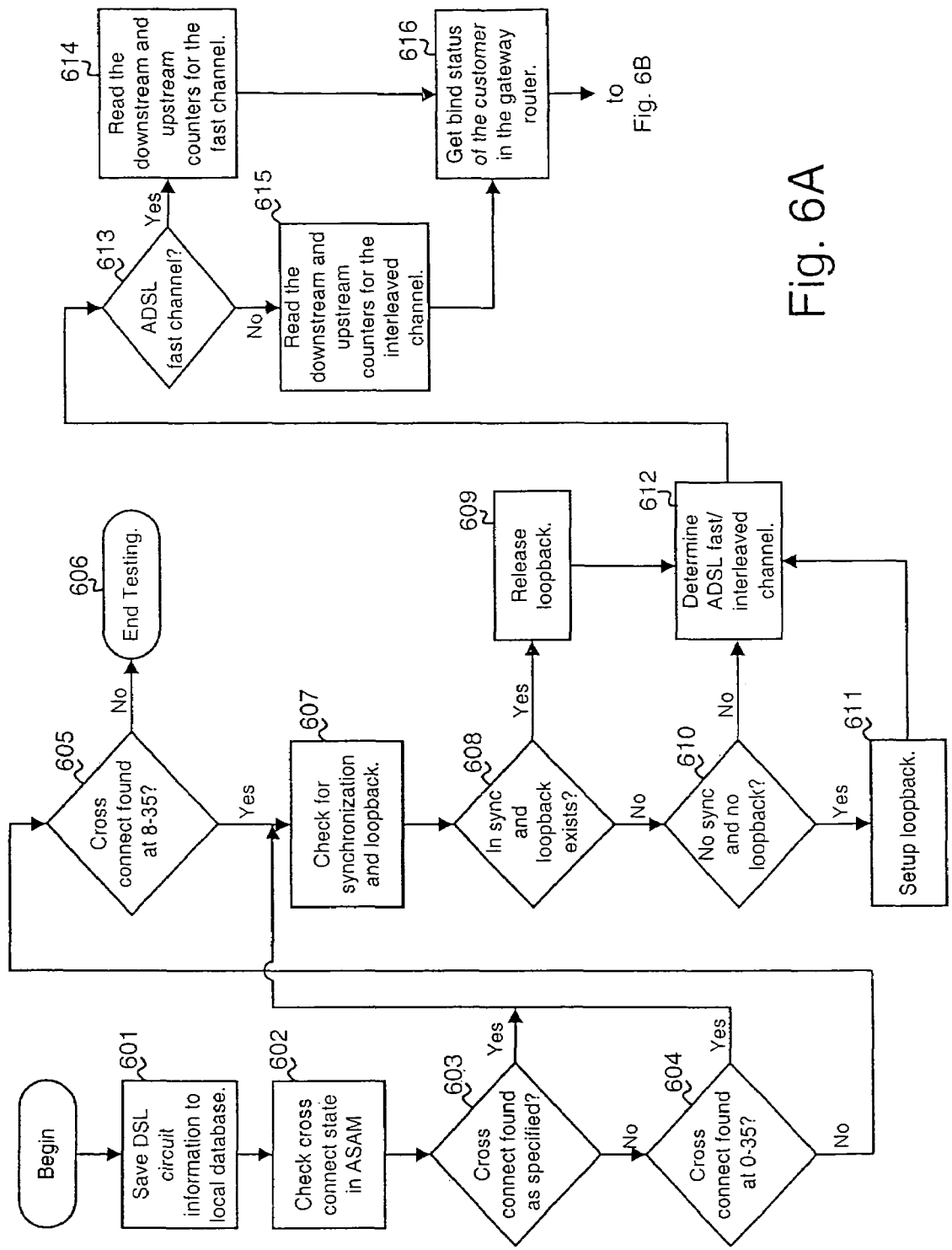
FIGS. 6A and 6B are flow charts illustrating operation of the network testing tool in additional detail.
Figure 6B:
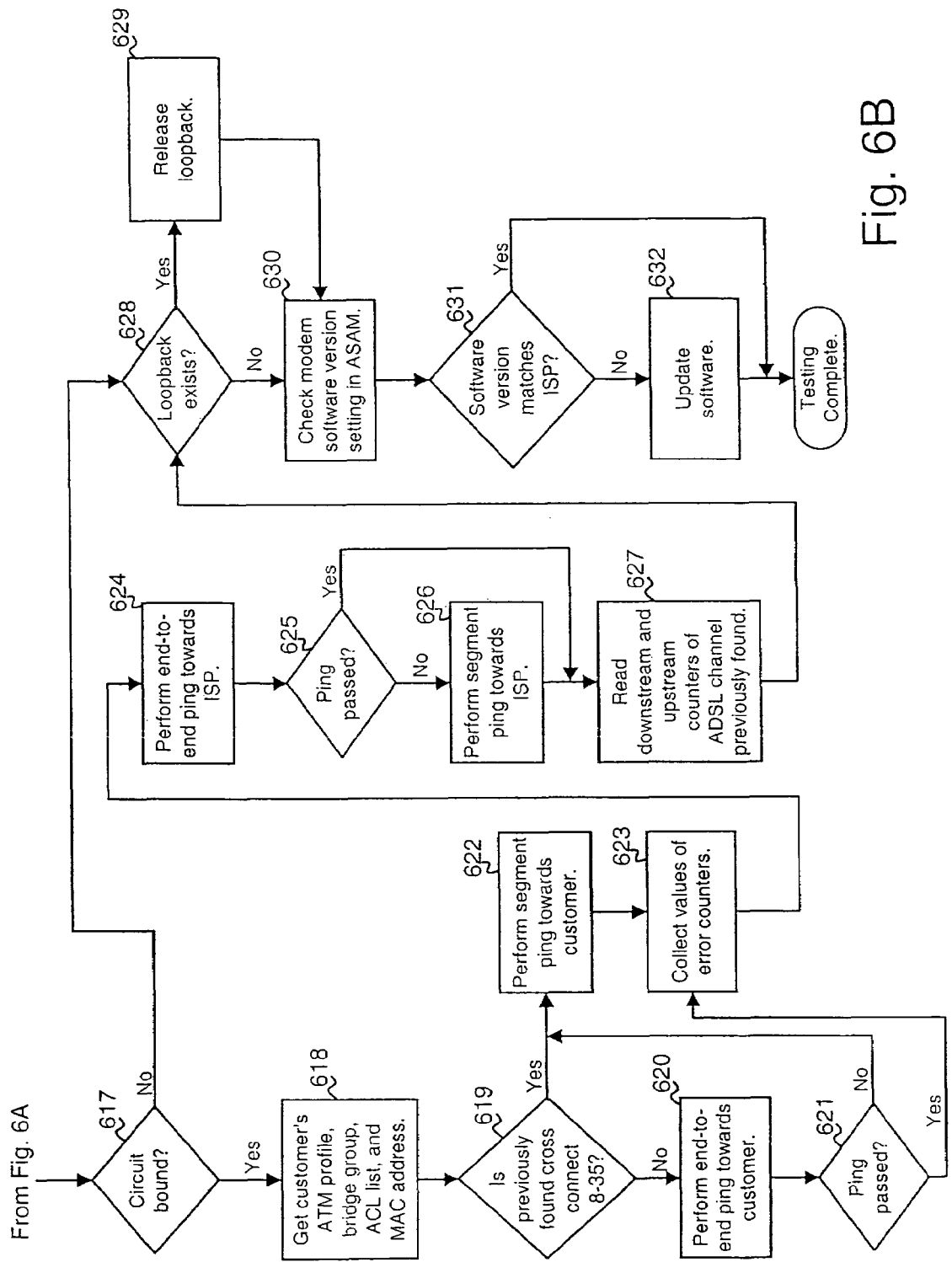

FIGS. 6A and 6B are flow charts illustrating, in detail, an exemplary testing cycle implemented by network testing tool 110. The testing cycle illustrated in FIGS. 6A and 6B may correspond to the testing performed in act 303 (FIG. 3). Although the testing cycle of FIGS. 6A and 6B will be described in reference to single circuit testing mode, one of ordinary skill in the art will appreciate that similar acts would be implemented for batch testing mode.

To begin, network testing tool 110 may save the DSL circuit inventory information and the DSL phone number in local replication database 124 (act 601). One parameter that may be set for proper DSL circuit operation is the so-called cross-connect state of the DSL circuit. The cross-connect state is configured in ASAM 141. Network testing tool 110 checks that the cross-connect state in ASAM 141 (act 602). If the cross-connect state is found as specified in the circuit inventory information, or if the cross-connect state is set in ASAM 141 as, for example, "0-35" or "8-35", network testing tool 110 continues testing (acts 603, 604, 605). Otherwise, if no appropriate cross-connect state is found, network testing tool 110 ends the testing procedure (act 606).

Network testing tool 110 next checks whether the DSL circuit has synchronization and loopback functionality (act 607). In general, synchronization refers to whether the customer modem is on and communicating with ASAM 141. Loopback is a testing state that is initiated in order to perform tests when there is no established synchronization. If there is synchronization and loopback, network testing tool 110 releases the loopback state, as loopback is not needed when there is synchronization (acts 608 and 609). If there is no synchronization and no loopback, network testing tool 110 established loopback (acts 608, 610, and 611).

Network testing tool 110 may next query ASAM 141 to determine whether the customer's connection is an ADSL (asynchronous DSL) fast channel or an interleaved channel (act 612). If it is a fast channel, Network testing tool 110 reads downstream and upstream counters associated with the fast channel (acts 613 and 614). Else, if it is an interleaved channel, network testing tool 110 reads downstream and upstream counters associated with the interleaved channel (acts 613 and 615).

Network testing tool 110 may next get the bind status of the customer in the gateway router 143 (act 616). The bind status is a configuration parameter in the router. If the circuit is bound (act 617), network testing tool 110 gets the subscriber's ATM profile, bridge group, ACL list, and MAC address (act 618). If the previously determined cross-connect was not "8-35", network testing tool performs an end-to-end test (ping) towards the subscriber side (act 620). That is, network testing tool 110 performs a complete network transmission test between gateway router 143 and the customer 160. If the ping test passes, network testing tool 110 collects the values of error counters in router 143 (acts 621 and 623). If the pin test does not pass, or if the previously determined cross-connect was "8-35", network testing tool 110 performs segment ping tests towards the subscriber (acts 619, 621 and 622). In a segment ping, network testing tool 110 performs ping tests on portions of the circuit. The network testing tool 110 may collect and store the values of error counters (act 623). In this manner, the portions of the circuit that caused the end-to-end ping test to fail can be isolated.

Network testing tool 110 may next perform an end-to-end ping between the gateway router 143 and ISP 162 (act 624). If this ping passes, network testing tool 110 collects values of the error counters (acts 625 and 627). If the end-to-end ping fails, network testing tool 110 performs segment ping tests before collecting the values of the error counters (act 625 and 626). Network testing tool 110 may next release the loopback state, if one exists (acts 628 and 629).

Network testing tool 110 may then check the modem software version setting in ASAM 141, (act 630), and if the software version does not match the version expected by ISP 162, network testing tool 110 updates the software (acts 631 and 632).

CONCLUSION

As described above, a DSL network testing tool automates the process of testing DSL circuits. The tool may run in a single circuit test mode or in a batch test mode. By employing the tool in batch test mode, a large number of circuits can be tested and the results are received in a short time frame. Business rules can be applied to the results to identify patterns of working DSL circuits and DSL circuits that are not working for similar reasons.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A system comprising:
   at least one database; and
   a network testing tool coupled to the at least one database, the network testing tool configured to
      receive inventory information from the at least one database, the inventory information corresponding to a plurality of DSL numbers each associated with a plurality of DSL circuit elements,
      group the plurality of DSL numbers into groups that have common DSL circuit elements, and
      test the plurality of DSL circuit elements in batch test mode.

2. The system of claim 1 wherein the network testing tool is further configured to
   provide a user interface to a remote computing device, the user interface configured to receive the plurality of DSL numbers.

3. The system of claim 1, further comprising:
   a replication database connected locally to the network testing tool, the network testing tool duplicating select information retrieved from the at least one database in the replication database.

4. A method comprising:
   providing a first user interface display to a remote computing device, the first user interface display configured to allow a user to enter a number identifying a DSL circuit;
   receiving the number identifying the DSL circuit from the remote computing device;
   sending to a database a query, the query including the number identifying the DSL circuit;
   receiving a response of the database, the response including network element information associated with the DSL circuit, the network element information corresponding to a plurality of network elements used by the DSL circuit;
   automatically initiating a first test on the plurality of network elements used by the DSL circuit;
   receiving first results of the first test; and
   providing a second user interface display to the remote computing device, the second user interface display configured to display the first results;

wherein receiving the results of the first test includes reading the contents of error counters of at least one of the plurality of network elements.

5. The method of claim 4 wherein the plurality of network elements include at least one of an advanced services access manager (ASAM), a switch and a gateway router.

6. The method of claim 4 wherein automatically initiating the first test includes establishing a telnet session with at least one of the plurality of network elements.

7. The method of claim 4 further comprising
populating remediation templates with the network element information;
indicating remedial actions to be taken on the DSL circuit based on the first results and the remediation templates.

8. The method of claim 4 wherein the number identifying the DSL circuit is a ten digit phone number.

9. The method of claim 4 wherein automatically initiating the first test includes executing at least one script file customized for at least one of the plurality of network elements.

10. The method of claim 4, further comprising:
automatically initiating a second test on at least one of the plurality of network elements used by the DSL circuit;
receiving second results of the second test;
including in the second user interface display the second results.

11. The method of claim 10, wherein the first test is an end-to-end ping test, and the second test is segment ping test.

12. The method of claim 4, wherein automatically initiating the first test includes establishing synchronization or loopback with a modem associated with the DSL circuit, checking a cross-connect state of the DSL circuit, and obtaining a bind status of a gateway router for the DSL circuit.

13. A computer-readable medium storing instructions executable by a processor, the instructions configured to cause the processor to perform the method of claim 4.

14. A method comprising:
receiving a plurality of numbers identifying a plurality of DSL circuits from a first remote database;
sending a query to a second remote database, the query including the plurality of numbers;
receiving inventory information of the second database associated with the plurality of DSL circuits, the inventory information identifying equipment assigned to service the plurality of DSL circuits;
automatically initiating a plurality of tests on the equipment assigned to service the plurality of DSL circuits;
receiving results of the plurality of tests;
sending the results to a third database.

15. The method of claim 14, wherein the first database is a trouble ticket database, the second database is a provisioning and inventory database, and third database is a results database.

16. The method of claim 14, wherein automatically initiating the plurality of tests on the equipment assigned to service the plurality of DSL circuits includes determining whether to initiate one of the plurality of tests based on the results of a previous test of the plurality of tests.

17. The method of claim 14, wherein automatically initiating the plurality of tests includes ordering the plurality of tests such that resource conflicts between each of the plurality of tests are minimized.

18. The method of claim 14, wherein the plurality of tests includes an end-to-end ping test and a segment ping test.

19. A computer readable medium storing instructions executable by a processor, the instructions configured to cause the processor to perform the method of claim 14.

* * * * *